US010302129B2

(12) United States Patent
Poglitsch

(10) Patent No.: US 10,302,129 B2
(45) Date of Patent: May 28, 2019

(54) LINEAR GUIDE, IN PARTICULAR FOR A COORDINATE MEASURING MACHINE

(71) Applicant: Carl Zeiss Industrielle Messtechnik GmbH, Oberkochen (DE)

(72) Inventor: Christof Poglitsch, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 206 days.

(21) Appl. No.: 15/429,025

(22) Filed: Feb. 9, 2017

(65) Prior Publication Data

US 2017/0227050 A1    Aug. 10, 2017

(30) Foreign Application Priority Data

Feb. 9, 2016 (DE) .......................... 10 2016 201 922

(51) Int. Cl.
*F16C 32/06* (2006.01)
*F16C 43/00* (2006.01)
*G01B 5/008* (2006.01)

(52) U.S. Cl.
CPC .......... *F16C 32/0622* (2013.01); *F16C 43/00* (2013.01); *G01B 5/008* (2013.01); *F16C 2226/40* (2013.01); *F16C 2370/00* (2013.01)

(58) Field of Classification Search
CPC .. F16C 32/0622; F16C 43/00; F16C 2226/40; F16C 2370/00; G01B 5/008; G01B 7/008
USPC .......................................................... 33/503
See application file for complete search history.

(56) References Cited

U.S. PATENT DOCUMENTS

| 3,205,587 | A |   | 9/1965 | Kilburn |   |
|---|---|---|---|---|---|
| 4,035,037 | A | * | 7/1977 | Cunningham | F16C 27/02 384/100 |
| 4,155,173 | A | * | 5/1979 | Sprandel | G01B 5/008 33/1 M |
| 5,200,014 | A | * | 4/1993 | Peters | F16C 29/025 156/245 |

(Continued)

FOREIGN PATENT DOCUMENTS

JP   S63231019 A   9/1988
JP   2014173640 A   9/2014

OTHER PUBLICATIONS

English translation of the Office action of the German Patent Office dated Dec. 23, 2016 in German patent application 10 2016 201 922.8 on which the claim of priority is based.

*Primary Examiner* — Christopher W Fulton
(74) *Attorney, Agent, or Firm* — Walter Ottesen, P.A.

(57) ABSTRACT

A linear guide includes an elongate guide body and a bearing cage, on the inner sides of which fluid pressure bearings are provided. The bearing cage moves along the guide body via the bearings. The bearing cage includes at least three interconnected plates. The plates each have an inner surface facing the guide body, an outer surface facing away from the guide body and side surfaces between the inner and the outer surface. Each plate is connected to a first other plate in a first end region and connected to a second other plate in an opposite second end region. For each of the plates: the first other plate, with its inner surface, abuts against a side surface of the considered plate, while the considered plate, with its inner surface, abuts against a side surface of the second other plate in the second end region of the considered plate.

14 Claims, 7 Drawing Sheets

(56) References Cited

U.S. PATENT DOCUMENTS

| | | | |
|---|---|---|---|
| 6,428,210 B1 * | 8/2002 | Kafai | F16C 29/025 |
| | | | 384/12 |
| 6,629,778 B1 | 10/2003 | Enderle et al. | |
| 9,109,747 B2 | 8/2015 | Schernthaner | |
| 9,435,645 B2 * | 9/2016 | Pettersson et al. | G01B 5/008 |
| 2009/0067764 A1 | 3/2009 | Kawai et al. | |
| 2014/0222372 A1 * | 8/2014 | Sprenger | G01B 5/008 |
| | | | 702/155 |

* cited by examiner

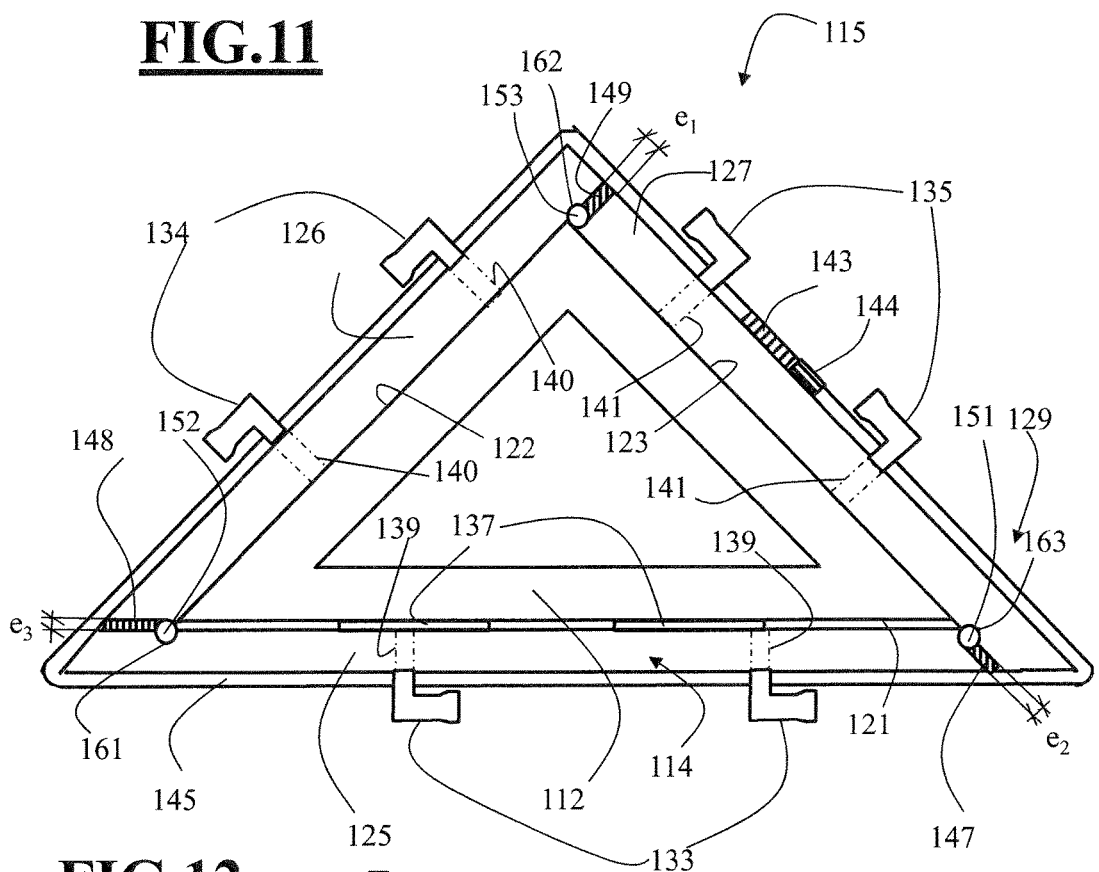
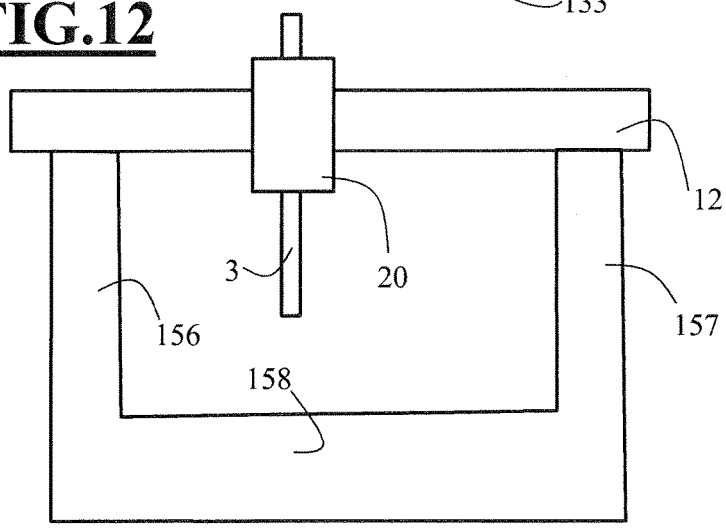

LINEAR GUIDE, IN PARTICULAR FOR A COORDINATE MEASURING MACHINE

CROSS REFERENCE TO RELATED APPLICATION

This application claims priority of German patent application no. 10 2016 201 922.8, filed Feb. 9, 2016, the entire content of which is incorporated herein by reference.

FIELD OF THE INVENTION

The invention relates to a linear guide, in particular for a coordinate measuring machine, having an elongate guide body and a bearing cage, on the inner sides of which fluid pressure bearings are provided. The bearing cage is provided to move along the elongate guide body by way of the fluid pressure bearings. The bearing cage includes at least three plates which are fastened to one another. Each one of the plates has an inner surface facing the guide body, an outer surface facing away from the guide body and side surfaces between the inner surface and the outer surface. Each one of the plates is connected to a first other plate in a first end region and connected to a second other plate in an opposite second end region for the purposes of forming the bearing cage.

BACKGROUND OF THE INVENTION

By way of example, such a linear guide for a coordinate measuring machine is shown in U.S. Pat. No. 6,629,778 B1. FIG. 1 of this document shows such a linear guide in a side illustration, the linear guide likewise including an elongate guide body and a bearing cage, on the inner sides of which fluid pressure bearings are provided. Here, the bearing cage is provided to move along the elongate guide body by way of the fluid pressure bearings. In the embodiment shown therein, the bearing cage includes four plates which are fastened to one another, wherein each plate includes an inner surface facing the guide body, an outer surface facing away from the guide body and side surfaces between the inner surface and the outer surface. For the purposes of forming the bearing cage, each plate is connected to a first other plate in a first end region and to a second other plate in an opposite second end region. With a side surface, the upper plate of the bearing cage in this case abuts against the inner surface of the plate respectively fastened thereto in both the first end region and the second end region. Here, fastening to one another is carried out by screws in each case. By contrast, with the side surface thereof, the lower plate of the bearing cage on one side abuts against the inner surface of a vertical plate fastened thereto. By contrast, the inner surface of this lower plate abuts against a side surface of a vertical place adjoining thereon in the other end region of this lower plate. Here too, the plates respectively fastened to one another are connected by way of screws.

Here, air bearings are used throughout as fluid pressure bearings in the bearing cage, these fluid pressure bearings being separated from the plates of the bearing cage. The relevant air bearings include a membrane which may deform under the pressure of the air. In two of the four plates of the bearing cage, the fastening of the air bearings has a rigid embodiment in the direction perpendicular to the inner surface of the respective plate on which an air bearing is fastened. However, some of these air bearings may carry out rotations. The corresponding axes of rotation are parallel to the plane formed by the inner surface of the respective plate on which the respective air bearings are incorporated. By contrast, air bearings which are fastened by way of springs on the respective inner surfaces of the plates are arranged on the two other plates of the bearing cage, which likewise immediately adjoin one another. As a result of this, each one of the relevant air bearings may carry out a movement in a direction perpendicular to the plane which is formed by the respective inner surface of the associated plates. Moreover, a bearing by means of which the relevant fluid pressure bearings may likewise carry out rotations about axes of rotation relative to the respective plate is additionally provided. The axes of rotation are likewise parallel to the plane formed by the respective inner surface of the plate.

Such a linear guide works very well indeed. However, the production of such a linear guide is relatively complicated on account of the fluid pressure bearings which are to be produced separately.

The prior art has also disclosed linear guides of the aforementioned type, in which the fluid pressure bearing is formed by the plate itself. To this end, the plate substantially has only one hole which is supplied with the fluid (generally air), with the fluid then flowing in a very narrow gap between the inner side of the respective plate and the guide body. A reducer may be provided in the hole in order to limit the flow of the fluid. Here, the peculiarity of such a bearing cage should be considered that of the relevant bearing cage having to be adapted very precisely to the respective elongate guide body. This moreover has as a consequence that the elongate guide body must be manufactured very precisely so that the latter fits to the respective bearing cage.

U.S. Pat. No. 9,109,747 B2 has disclosed a method, by means of which elongate guide bodies may be produced by virtue of four ceramic plates being adhesively bonded to one another at the ends thereof. This renders a comparatively simple production of ceramic guides possible. However, the peculiarity of this method should be considered that of such guides only being able to be produced within relatively rough tolerances.

SUMMARY OF THE INVENTION

Proceeding therefrom, it is an object of the invention to provide a linear guide which is easy to produce.

The object can, for example, be achieved by a linear guide having an elongate guide body; a bearing cage defining inner sides; a plurality of fluid pressure bearings disposed on the inner sides of the bearing cage; the bearing cage being configured to move along the elongate guide body via the fluid pressure bearings; the bearing cage including at least three plates fastened to one another; each of the plates having an inner surface facing the elongate guide body, an outer surface facing away from the guide body, and side surfaces between respective inner surfaces and respective outer surfaces; each of the at least three plates having a first end region and a second end region disposed opposite to the first end region; each of the at least three plates having a first connection whereat the plate is connected at the first end region thereof to a first other one of the at least three plates and a second connection whereat the plate is connected to a second other one of the at least three plates for forming the bearing cage; each of the at least three plates abutting with one of the side surfaces thereof against the respective inner surface of the first other one of the at least three plates for the first connection; and, each of the at least three plates abutting with their respective inner surface against one of the side surfaces of the second other plate for the second connection.

A feature of a solution according to the invention is that the following applies for each one of the plates of the bearing cage: the first other plate, with the inner surface thereof, abuts against one of the side surfaces of the considered plate for the connection in the first end region of a considered plate, while the considered plate, with the inner surface thereof, abuts against one of the side surfaces of the second other plate in the second end region of the considered plate. As a result, the feature outlined below now emerges. During the production of the bearing cage, the considered plate may be displaced along the inner surface of the first other plate in the first end region, in which the first other plate, with the inner surface thereof, abuts against a side surface of the considered plate. As a result of this, corresponding dimensional deviations of the elongate guide body may be compensated for by a corresponding displacement of the considered plate relative to the inner surface of the first other plate. Since each plate of the bearing cage now has such a first end region, each plate of the bearing cage may be displaced, in the first end region of the plate, relative to the respective first other plate in order to compensate for manufacturing inaccuracies of the elongate guide body.

Here, the number of plates may vary with the number of guide surfaces of the elongate guide body in a manner dependent on the respective elongate guide body. By way of example, the prior art has disclosed elongate guide bodies with a triangular profile, with a guide surface being situated on each one of the three sides of the elongate guide body. In this case, the bearing cage includes exactly three plates. Furthermore, the prior art has also disclosed elongate guide bodies with a rectangular or square profile, with each one of the four outer sides of the elongate guide body forming a guide surface. In this case, the bearing cage includes exactly four plates. Purely as a matter of principle, the elongate guide body could however also have other profiles, for example a profile with five or six guide tracks, if this were desired. Naturally, the bearing cage would also include five or more plates in this case.

Here, the plates may be manufactured from very different materials. Here, aluminum, as this metal is relatively light, or else ceramic, since this material is relatively insensitive to temperature, is suitable in a particularly advantageous manner. However, the plates could just as easily be produced from steel.

The fluid pressure bearings are preferably embodied as air bearings in this case. This is connected with the particular advantage that pressurized air connectors are usually provided in manufacturing surroundings and hence there is no need to provide a separate supply for the fluid. Moreover, there is no need to separately capture the fluid when it emerges from the air bearing.

Here, the plates are particularly advantageously adhesively bonded to one another by way of an adhesive or else by way of cement. In particular, this has the particular advantage outlined below. Here, the adhesive bonding or the cement may act like a joint between the plates adhesively bonded to one another in each case. In particular, this adhesive joint or cement joint allows compensation of inaccuracies of the side surface of one plate which is adhesively bonded onto the inner surface of another plate.

When adhesively bonding the plates to one another, the adhesive or the cement should be prevented from entering into the region of the fluid pressure bearings on the inner surfaces of the plates of the bearing cage. Preferably, a seal between the plates may be provided at those points at which two plates are connected to one another in each case, the seal preventing an ingress of the adhesive or of the cement into the region of the fluid pressure bearings on the inner surfaces of the plates during the production. To this end, each plate preferably includes a groove on the inner surface thereof in the second end region, with a seal being arranged in the groove in each case. This ensures that the respective seals are arranged at a suitable point during the adhesive bonding.

In principle, a robust bearing cage arises as a result of adhesive bonding the plates. However, for reasons of safety, provision could additionally be made for one or more tensioning devices, via which the plates are tensioned against one another. This ensures that the plates cannot fall apart, even if the adhesive between the plates does not withstand the mechanical loads. By way of example, a threaded rod with two nuts may be used as tensioning device, with the tensioning force being generated by tightening the two nuts. Alternatively, a tensioning device may also include a wire cable with a set screw and an internally threaded sleeve. The set screw is fastened on one end of the wire cable, with the internally threaded sleeve being fastened to the second end. Here, like a tiedown strap of a roof rack, the wire cable is placed around the bearing cage, with the set screw being screwed into the internally threaded sleeve for tensioning purposes.

Purely as a matter of principle, fluid pressure bearings as explained in the U.S. Pat. No. 6,629,778 B1 could be used as fluid pressure bearings. However, it is substantially more advantageous if the fluid pressure bearing is formed by the respective plate itself, as we have already described above. To this end, the respective plate has one or more holes, through which the fluid (generally air) flows in, with the fluid then flowing in a very narrow gap between the inner side of the respective plate and the guide body. A reducer may be provided in each hole in order to limit the flow of the fluid.

As a matter of principle, a linear guide as mentioned at the outset may in this case be used in all possible machines used in engineering, such as for example machine tools, milling machines, et cetera. However, this linear guide is particularly suitable for a coordinate measuring machine. The coordinate measuring machine may particularly suitably be a portal measuring machine or a bridge measuring machine in this case, the coordinate measuring machine including a first measuring carriage mounted such that it is movable in a first direction by two guides arranged laterally on a base of the coordinate measuring machine. Here, a second measuring carriage is guided in a movable manner along the part of this first measuring carriage spanning the base, with a third measuring carriage being guided in a movable manner in the vertical direction along the second measuring carriage, a sensor (for example a tactile sensor or optical sensor) being fastened to the lower end of the third measuring carriage. Here, the linear guide may be provided for movably mounting the second measuring carriage on the first measuring carriage.

According to the invention, a linear guide of the aforementioned type may, for example, be produced according to the following method:

a. providing an elongate guide body, b. affixing a first plate with the inner surface thereof on a first guide surface of the guide body, c. affixing a second plate with the inner surface thereof on a second guide surface of the guide body adjoining the first guide surface of the guide body, with the second plate with the inner surface thereof abutting against the second guide surface of the guide body, wherein, further, a side surface of one of the two plates is opposite the inner surface of the respective other plate and wherein a gap remains between this side surface of the one plate and the inner surface of the other plate, d. respectively affixing a further plate on each guide surface of the elongate guide body on which no plate has yet been fixed, wherein this further plate/these further plates is/are each affixed with the inner side thereof on a spacer previously arranged on the respective guide surface and, in the process, is/are affixed in such a way that once affixing of the further plate/the further plates has been completed, one side surface of a further plate considered in each case is respectively opposite the inner surface of a first other plate and a gap remains between this side surface and the inner surface, while the inner surface of this further plate considered in each case is opposite the side surface of a second other plate and a further gap remains between this inner surface and the side surface, e. filling the gaps with an adhesive or cement.

This particular method according to the invention may be developed by virtue of a tensioning device being applied after step e.), via which at least two of the interconnected plates are tensioned against one another in each case.

Here, a gauge may be used for adjusting the gap in step c), this gauge being used to set the position of the first plate on the first guide surface in step b) in such a way that the gap arises when affixing the second plate on the second guide surface in step c).

Moreover, at least one additional spacer may be used to set at least one gap in step d), the spacer being placed between the inner surface of an already affixed plate and the side surface of the further plate before affixing a further plate in accordance with step d), wherein the spacer is removed again after affixing the further plate.

BRIEF DESCRIPTION OF THE DRAWINGS

The invention will now be described with reference to the drawings wherein:

FIG. 11 is a schematic side view of the linear guide 115 according to FIG. 10, the illustration depicting the linear guide immediately after the last assembly step of the bearing cage 114 and further details of the bearing cage 114, which are not illustrated in FIG. 10, also being visible here; and, FIG. 12 shows a very abstract schematic diagram of an alternative coordinate measuring machine to the coordinate measuring machine 19 according to FIG. 1, in the form of a bridge measuring machine on which a linear guide according to the invention is used.

DESCRIPTION OF THE PREFERRED EMBODIMENTS OF THE INVENTION

Figure 1:
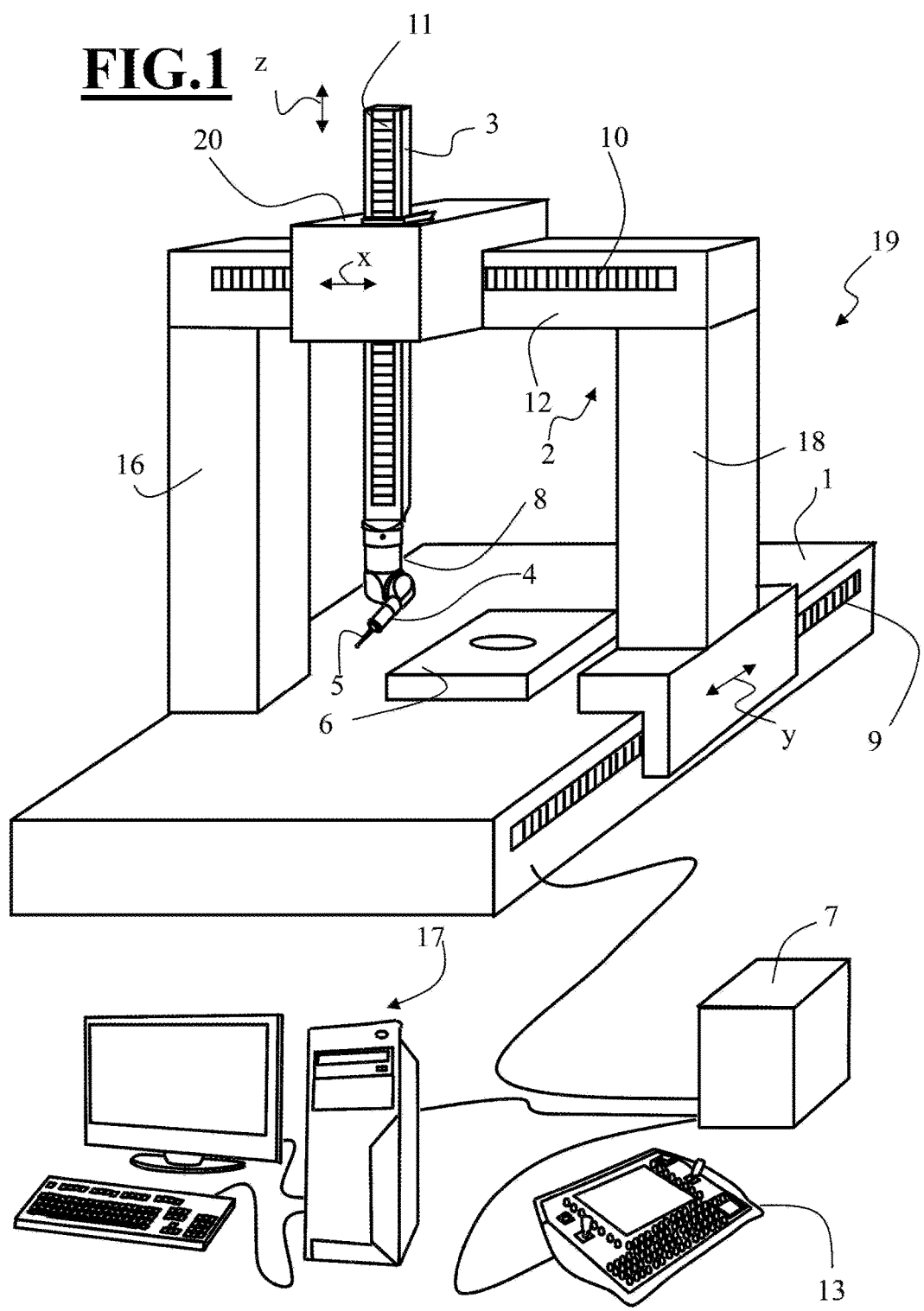
FIG. 1 shows a coordinate measuring machine 19 as a portal measuring machine, on which a linear guide according to the invention is used.

FIG. 1 shows, purely schematically, a coordinate measuring machine 19 in which use is made of a linear guide according to the invention (not shown in any more detail). The coordinate measuring machine 19, which is illustrated here purely by example, in the present case has what is known as a portal construction, wherein a first measurement carriage 2 in the form of a portal is guided movably along two parallel guides in the region of the base (in the present case, the guides are a component of the measuring table 1, which in turn is a component of the base).

A scale system 9 having a corresponding read sensor, which is not illustrated here in more detail, is provided for measuring the position of the portal. Additionally, a drive is provided which may displace the first measuring carriage 2 along the guide in the direction marked with the arrow y. A second measuring carriage 20 (often denoted the x-carriage) is guided movably along the crossbeam of the portal-type first measuring carriage 2 that bridges the base (measuring table 1), wherein the second measuring carriage has a scale system 10 with associated read sensor for position measurement in the direction which is marked by the arrow x. Here, the crossbeam of the first measuring carriage 2 is formed by an elongate guide body 12, which rests on two columns 16 and 18 of the first measuring carriage 2. The elongate guide body 12 is part of a linear guide 15 according to the invention, with, furthermore, a bearing cage 14 (cf. FIG. 2) interacting with the elongate guide body 12 being provided in the interior of the second measuring carriage 20, the bearing cage moving along the elongate guide body 12 by way of fluid pressure bearings (here in the form of air bearings). This bearing cage 14 cannot be seen in FIG. 1 as it is situated in the interior of the second measuring carriage 20. Here, the scale system 10 depicted with exaggerated dimensions in FIG. 1 is arranged in a groove which is worked into the shown guide surface of the elongate guide body 12. Here, the groove is worked into a region of the guide surface which has a relatively large distance from the fluid pressure bearings (that is, the air bearings in this case) in the bearing cage 14.

The second measuring carriage 20 may be moved in the direction denoted by the arrow x by way of a second drive.

Movably guided on the second measuring carriage 20 in turn is a third measuring carriage 3 (often referred to as a quill), wherein the position of the measuring carriage 3 in the direction which is denoted by the arrow z may be ascertained by way of a scale system 11 with an associated read sensor, and a drive is again provided in order to move the third measuring carriage 3 in the third coordinate direction z. A rotation unit 8 in the form of a rotary pivot joint is fastened to the lower end of the third measuring carriage 3, via which rotational unit a tactile sensor 4 with its sensing device 5 fastened thereto may be rotated about two perpendicular axes of rotation. Naturally, the tactile sensor 4 may also be fastened directly to the third measuring carriage 3. An optical sensor may also be used instead of a tactile sensor 4.

Here, a workpiece 6 is arranged on the measuring table 1, the workpiece being probed by the tactile sensor 4 by moving the three measuring carriages 2, 20, 3, wherein measurement values on the surface of the workpiece 6 to be measured are ascertained from the signals of the sensor 4 and from the scale system positions of the scale systems 9, 10, 11. The controller for controlling the drives of the measurement carriages 2, 20, 3 is situated in the control system 7. In addition, the scale system values of the scale systems 9, 10, 11 are also read by the control system 7, as are the signals of the sensor 4. Furthermore connected to the control system 7 is a measurement computer 17. The measurement computer 17 is here used to create a measurement sequence and pass on the information necessary for performing the measurement sequence to the control system 7. The control system 7 then carries out the measurement sequence. The control system 7 in turn supplies, inter alia, the ascertained measurement values of the workpiece 6 to the measurement computer 17, where the returned values are then evaluated by the measurement computer 17. Furthermore, the reference sign 13 denotes a control panel connected to the control system 7, wherein the control panel may be used to manually adjust the drives of the coordinate measuring machine 19.

Figure 2:
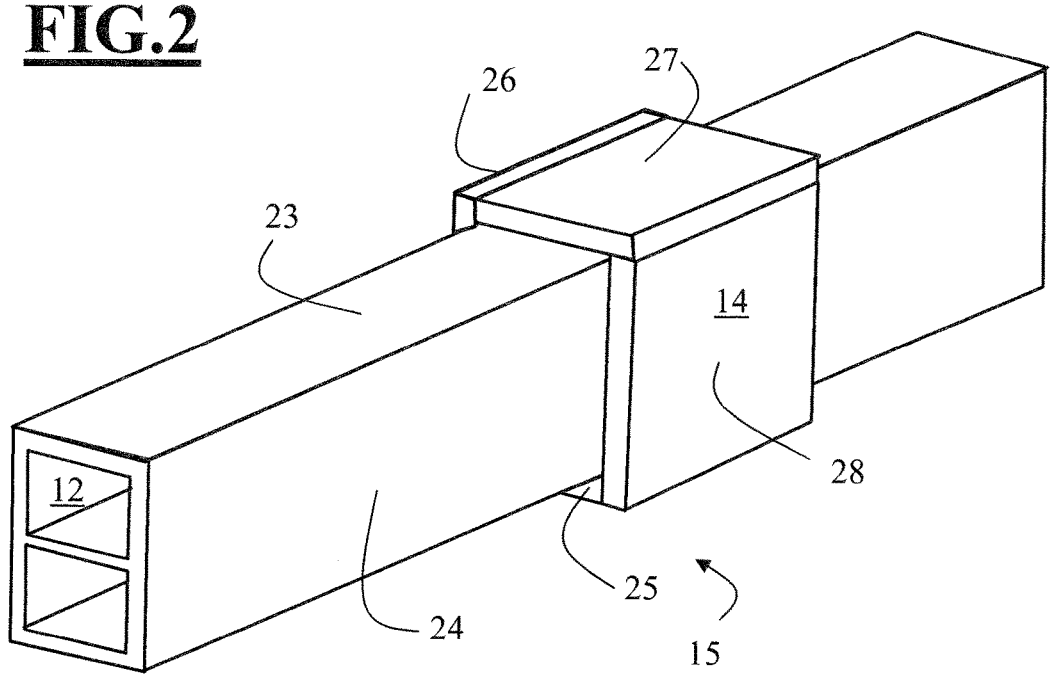
FIG. 2 is a schematic illustration of a linear guide 15, including an elongate guide body 12 and a bearing cage 14, with this linear guide 15 being used to guide the second measuring carriage 20 along the first measuring carriage 2 of the coordinate measuring machine 19 from FIG. 1.

In a purely schematic illustration, FIG. 2 shows the linear guide 15 which could be used to guide the second measuring carriage 20 along the first measuring carriage 2 of the coordinate measuring machine 19 from FIG. 1. In the illustration shown in FIG. 2, many details in respect of the bearing cage 14 have been omitted; however, these are depicted in more detail in FIG. 3 and, in particular, in FIG. 4. Moreover, the scale system 10, which is visible in FIG. 1 and situated in a groove of the elongate guide body 12, has not been depicted. As can be seen from FIG. 2, the bearing cage 14 shown here includes exactly four plates 25, 26, 27 and 28, wherein the bearing cage 14 formed thus is able to move along the elongate guide body 12 as a result of air bearings. This linear guide, which is used in the coordinate measuring machine 19 from FIG. 1, in this case includes an elongate guide body 12 and a bearing cage 14, on the inner side of which fluid pressure bearings (in this case air bearings) are provided. Here, this bearing cage 14 is provided to move along the elongate guide body 12 by way of the fluid pressure bearings (in this case air bearings), with the bearing cage 14 in the present case including four plates 25, 26, 27 and 28 which are fastened to one another. As can also be easily identified from FIG. 2, each plate 25, 26, 27 and 28 has an inner surface facing the guide body 12, an outer surface facing away from the guide body 12 and four side surfaces between the inner surface and the outer surface, with each plate 25-28 being connected in a first end region to a first other plate and being connected in an opposite second end region to a second other plate for the purposes of forming the bearing cage 14.

Here, the connection between the plates 25-28 is of a special type, as will be explained below. By way of example, in the first end region thereof, plate 27 abuts with a side surface against the inner surface of the adjacent plate 26. In contrast thereto, in the opposite second end region thereof, plate 27 abuts with the inner surface thereof against the side surface of another plate 28. All four plates 25, 26, 27 and 28 are fastened to one another according to the same pattern. By way of example, for plate 28, this means that, in the first end region thereof, it abuts with the side surface thereof against the inner surface of plate 27 and, in the opposite second end region thereof, it abuts with the inner surface thereof against a side surface of the following plate 25. Plate 25, in the first end region thereof, abuts with a side surface against the inner surface of plate 28 and, in the opposite second end region thereof, abuts with the inner surface thereof against the side surface of plate 26. Plate 26, in the first end region thereof, in turn abuts with the side surface thereof against the inner surface of plate 25 and, in the opposite second end region thereof, abuts with the inner surface thereof against the side surface of plate 27.

Thus, the following applies for each one of the plates: the first other plate (plate 28), with the inner surface thereof, abuts against one of the side surfaces of a considered plate (for example plate 25) for the connection in the first end region of the considered plate (plate 25), while the considered plate, with the inner surface thereof, abuts against one of the side surfaces of the second other plate (plate 26) in the opposite second end region of the considered plate (plate 25).

Figure 3:
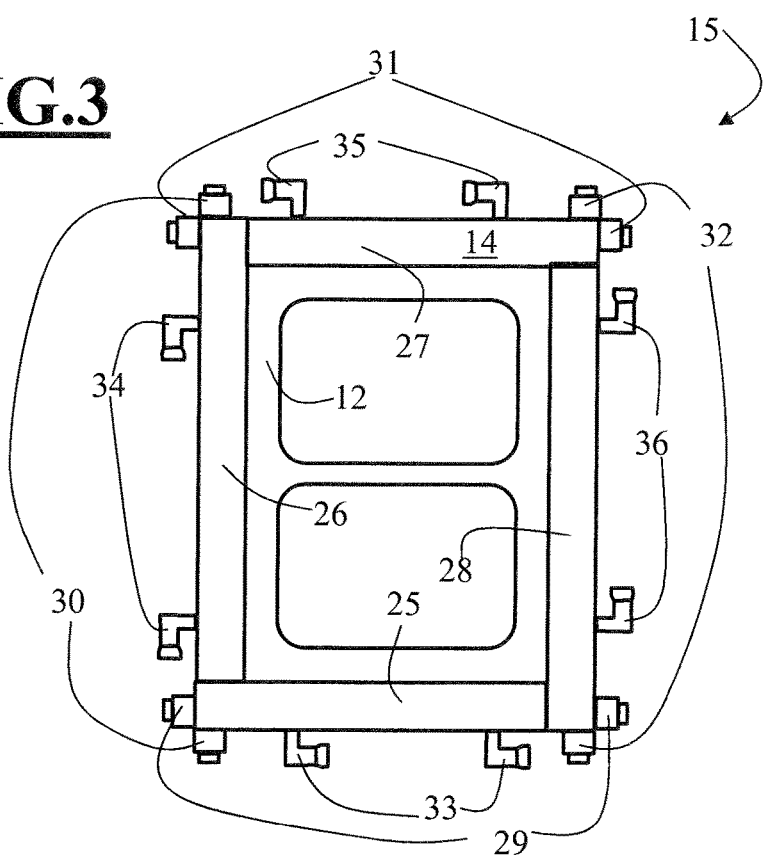
FIG. 3 is a schematic side view of the linear guide according to FIG. 2, with further details of the bearing cage 14, which are not illustrated in FIG. 2, being visible.

This can be seen once again in a slightly better manner in FIG. 3. Here, FIG. 3 shows a linear guide 15 in accordance with FIG. 2 in a side view. Moreover, FIG. 3 in this case shows further details of the bearing cage 14, which are not illustrated in FIG. 2. As may be seen in FIG. 3, each plate 25, 26, 27 and 28 includes pressurized air connectors 33, 34, 35 and 36, to which a corresponding pressurized air supply may be connected. The pressurized air connectors 33, 34, 35 and 36 are connected to corresponding pressurized air channels 39, 40, 41 and 42 (only visible in FIG. 4), which guide the pressurized air to the inner surfaces of the plates 25, 26, 27 and 28, with the inner surfaces of the plates acting as an air bearing as a result of this. Furthermore, tensioning devices 29, 30, 31 and 32 are provided, via which the plates 25, 26, 27 and 28 are tensioned against one another. These tensioning devices will still be explained in more detail below on the basis of FIG. 4.

A more detailed description of the bearing cage is now explained below in conjunction with FIG. 4. Here, FIG. 4 likewise shows a schematic side view of the linear guide 15 according to FIG. 2, with the illustration depicting the linear guide 15 immediately after the last assembly step of the bearing cage 14. Here, further details of the bearing cage 14 not depicted in FIG. 2 are visible particularly well from FIG. 4. Here, the same components as in FIGS. 2 and 3 are also denoted by the same reference signs. Here, the plates 25, 26, 27 and 28 are manufactured from ceramics. However, aluminum or steel could also be used as an alternative thereto. As already explained in conjunction with FIGS. 2 and 3, the plates 25, 26, 27 and 28 each have fluid pressure bearings in the form of air bearings, with each plate 25 to 28 to this end having pressurized air connectors 33, 34, 35 and 36. Here, pressurized air tubes of the coordinate measuring machine are clamped onto these pressurized air connectors 33, 34, 35 and 36, with the pressurized air connectors 33, 34, 35 and 36 being connected to the inner sides of the plates 25, 26, 27 and 28 by way of pressurized air channels 39, 40, 41 and 42. Here, reducers (not depicted in any more detail) which reduce the pressurized air flow are situated in the pressurized air channels 39, 40, 41 and 42. After emergence from the pressurized air channels 39, 40, 41 and 42, the pressurized air is distributed on the inner surface of the respective plate and acts as an air pressure bearing in the process. Here, the plates 25, 26, 27 and 28 are adhesively bonded to one another by way of an adhesive 47, 48, 49 and 50. Alternatively, it would also be possible to use cement. Here, the adhesive 47, 48, 49, 50, or alternatively the cement, serves to compensate for unevenness of the respective side surface of the relevant plate 25, 26, 27 and 28. Therefore, the relevant adhesive or, alternatively, the cement should be as rigid as possible after curing in order to establish a rigid connection between the plates 25-28. By way of example, an epoxy resin adhesive may be used to this end. When adhesively bonding the plates 25, 26, 27 and 28 to one another, it is important here that the corresponding adhesive does not reach the inner surfaces of the plates and generate unevenness as a result thereof. Therefore, preferably, a seal (see seal 51, 52, 53 and 54) between the plates should be provided at those points at which two plates 25, 26, 27 and 28 are connected to one another in each case, the seal preventing an ingress of the adhesive or of the cement into the region of the fluid pressure bearings on the inner surfaces of the plates 25-28. The seals 51, 52, 53 and 54 used in the process are so-called round cords in this case. In order to ensure that the seals 51, 52, 53 and 54 come to rest at the correct position during the assembly of the bearing cage 14, each plate 25, 26, 27 and 28 includes a groove 60, 61, 62 and 63 on the inner surface and in the second end region thereof, one of the seals 51, 52, 53 and 54 in each case being arranged in the groove. Here, the seals 51-54 may be affixed in advance in the relevant groove 60-63 by way of a correspondingly appropriate adhesive.

As already mentioned in conjunction with FIG. 3, in addition to the adhesive bonding by the adhesive 47, 48, 49 and 50, the plates 25, 26, 27 and 28 are also tensioned against one another by way of tensioning devices 29, 30, 31 and 32 for reasons of safety. In the present embodiment, each tensioning device 29-32 includes a threaded rod and two associated nuts. Here, the tensioning device 29 includes the threaded rod 43 and the two nuts 56, the tensioning device 30 includes the threaded rod 44 and the two nuts 57, the tensioning device 31 includes the threaded rod 45 and the two nuts 58 and the tensioning device 32 includes the threaded rod 46 and the two nuts 59. By tightening the respective nuts on the respective threaded rod, the two relevant plates situated between the respectively assigned nuts are tensioned against one another by tightening the nuts. Should the case occur where the adhesive bond 47, 48, 49 or 50 dissolves over time, the plates continue to be held together by the tensioning device 29, 30, 31 or 32.

As already mentioned above, FIG. 4 shows the linear guide 15 according to FIG. 2, immediately after the last assembly step of the bearing cage 14. Unlike in FIG. 3, it is therefore still possible to see two spacer sheets 37 and two spacer sheets 38 next to the bearing cage 14 and the elongate guide body 12 in FIG. 4, the spacer sheets serving for the assembly of the bearing cage 14. The precise use of the spacer sheets 37 and 38 will still be explained below on the basis of FIGS. 5 to 9. Here, the spacer sheets 37 and 38 serve for the assembly of the bearing cage 14. They have a thickness which should correspond to twice the air bearing gap that should subsequently set in between the respective inner surface of a plate 25, 26, 27 and 28 and the elongate guide body 12.

The assembly of the bearing cage 14 shall now be explained in detail in conjunction with FIGS. 5 to 9. Just like in FIG. 2, FIGS. 5 to 9 once again do not depict the details of the plates 25, 26, 27 and 28, and so the drawings are reduced to the essential aspects of the production method.

Figure 4:
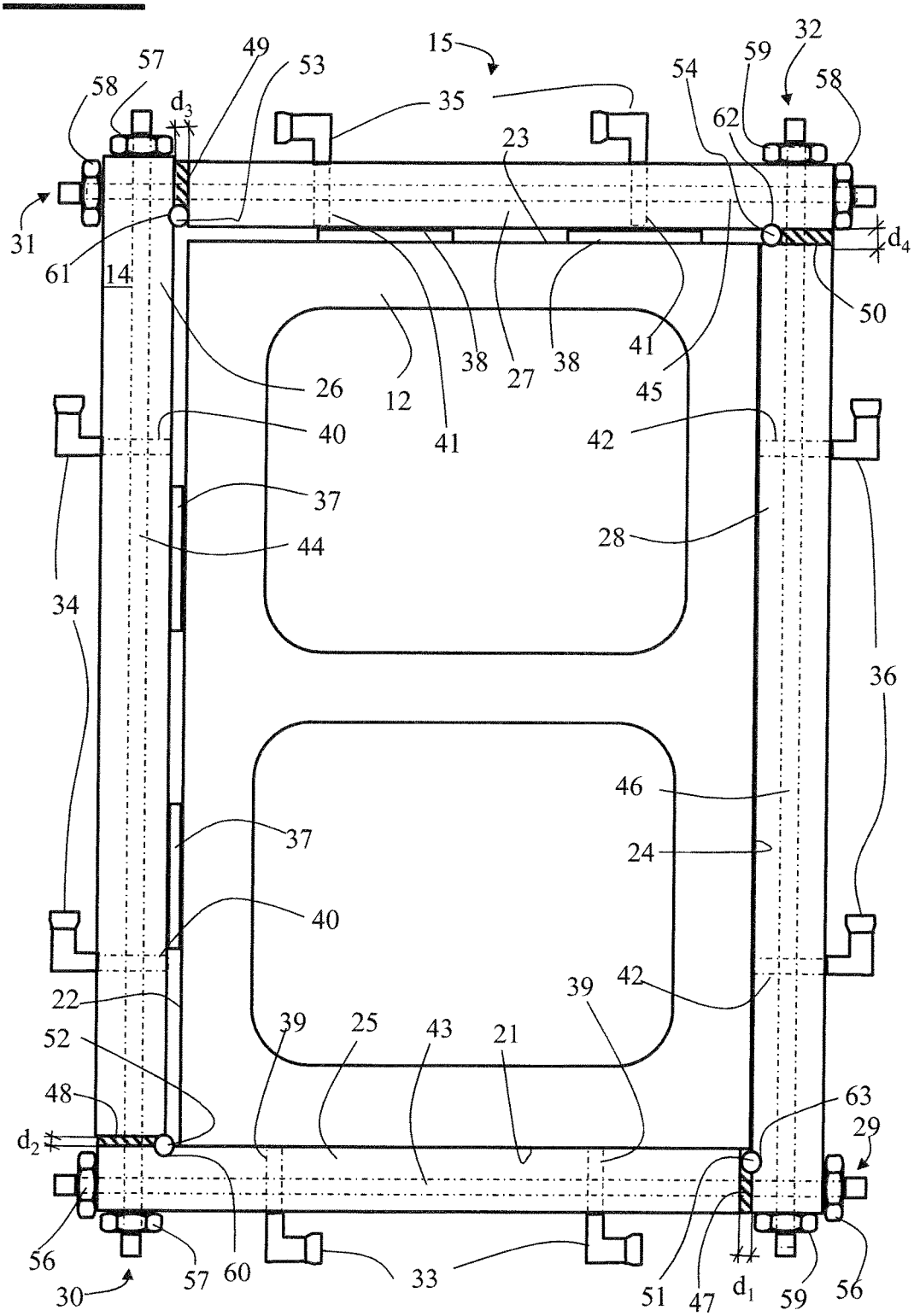
FIG. 4 is a schematic side view of the linear guide 15 according to FIG. 2, the illustration depicting the linear guide 15 immediately after the last assembly step of the bearing cage 14 and further details of the bearing cage 14, which are not illustrated in FIG. 2, also being visible here.
Figure 5:
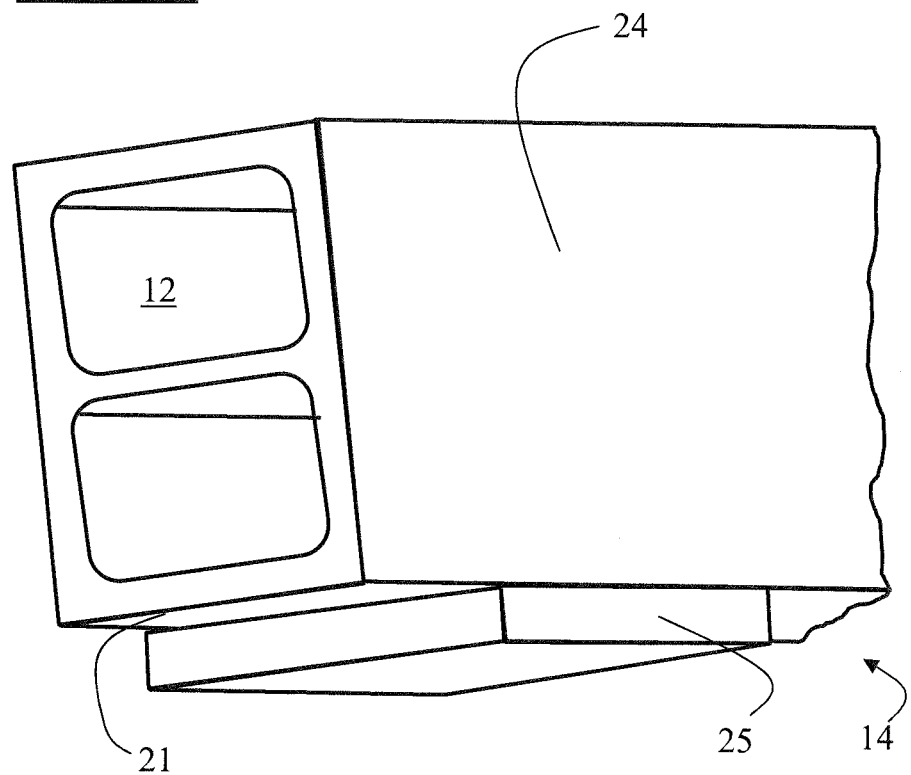
FIG. 5 is a schematic diagram of a first manufacturing step for producing the bearing cage 14 of the linear guide 15 from FIG. 2, in which the plate 25 is affixed to the guide body 12.

Here, FIG. 5 shows a first manufacturing step. Here, an elongate guide body 12 is provided and a first plate 25 is affixed with the inner surface thereof on a first guide surface 21 of the guide body 12. Here, affixing is carried out by way of for example a clamp. Alternatively, it would also be possible to connect the pressurized air connectors 33 of the plate 25, only described in conjunction with FIG. 4, to a vacuum device and carry out fixing by sucking the air bearing to the guide surface 21 of the guide body 12. What is important here is that the plate 25 is fastened to the guide surface 21 of the guide body 12 in such a way that the right-hand side surface of the plate 25 is arranged offset by a small travel in relation to the guide surface 24 of the elongate guide body 12 parallel thereto, as visible in FIG. 4. As a result of this, the gap $d_1$ should subsequently arise, the gap being filled up by the adhesive 47, which can be seen in FIG. 4. In order to generate the offset, for example 0.1 mm in relation to the guide surface 24 of the guide body 12, use may be made of for example a gauge.

Figure 6:
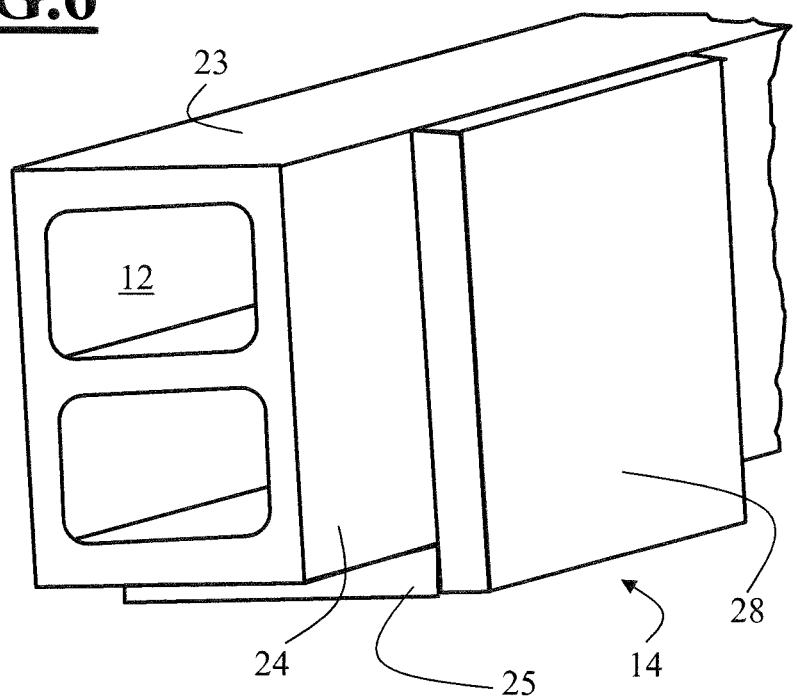
FIG. 6 is a schematic diagram of a second manufacturing step for producing the bearing cage 14 of the linear guide 15 from FIG. 2, in which the plate 28 is affixed to the guide body 12.

A further step is depicted in FIG. 6. In accordance with FIG. 6, a second plate 28 is affixed with the inner surface thereof on a second guide surface 24 of the guide body 12, the second guide surface adjoining the first guide surface 21 of the guide body 12, the second plate 28 with the inner surface thereof abutting against the second guide surface 24 of the guide body 12. In the present embodiment, the side surface of plate 25 is opposite the inner surface of plate 28 in this case, with the gap d1 visible in FIG. 4 remaining between the side surface of plate 25 and the inner surface of plate 28. In the case of plate 28, fixing may also be carried out in this case for example by way of clamps or by way of a vacuum pump connected to the pressurized air connectors 36 (cf. FIG. 4). Here, the seal 51 depicted in FIG. 4 was affixed in advance in the groove 63 of the plate 28, visible in FIG. 4, by way of some instant adhesive. Here, in contrast to plate 25, plate 28 may lie flush with the upper end of the elongate guide body 12. The reason for this lies in the fact that the gap d4 for the adhesive 50 is generated by spacer sheets 38, as is easily visible in FIG. 4. More details in respect of the spacer sheets 38 will still be explained below.

Figure 7:
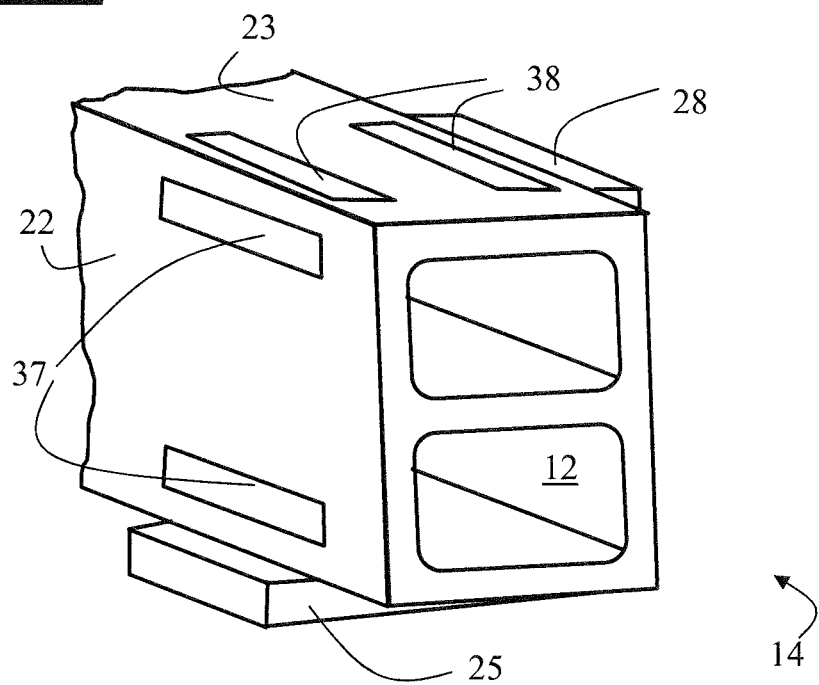
FIG. 7 is a schematic diagram of a third manufacturing step for producing the bearing cage 14 of the linear guide 15 from FIG. 2, in which the spacer sheets 37 and 38 are arranged on the guide body.

In a third method step, visible in FIG. 7, spacers (spacer sheets 37 and spacer sheets 38) are affixed on the two remaining guide surfaces 22 and 23 of the elongate guide body 12 on which no plate has yet been fixed. By way of example, this may be carried out by way of an adhesive tape at the ends projecting beyond the edge.

Figure 8:
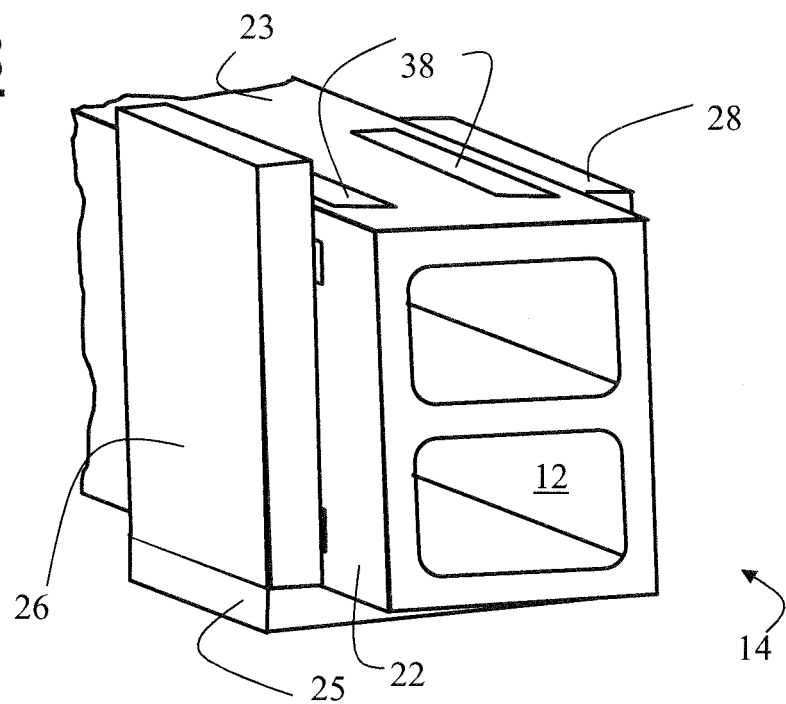
FIG. 8 is a schematic diagram of a fourth manufacturing step for producing the bearing cage 14 of the linear guide 15, in which the plate 26 is affixed to the guide body 12.
Figure 9:
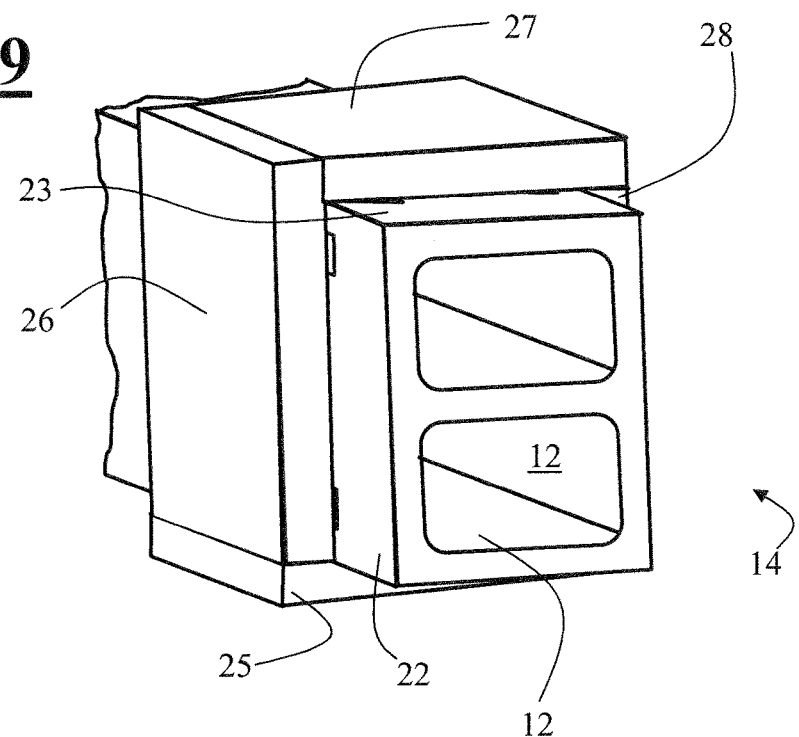
FIG. 9 is a schematic diagram of a fifth manufacturing step for producing the bearing cage 14 of the linear guide 15 from FIG. 2, in which the plate 27 is affixed to the guide body 12.

In the further method steps, shown in FIGS. 8 and 9, a further plate 26 and 27 is respectively fastened to each guide surface 22 and 23 of the guide body 12 on which the spacers (distance sheets 37 and 38) are fastened such that the inner surface of a respective plate 26 and 27 abuts against a spacer 37 and 38, respectively. Here, the plates 26 and 27 are affixed in such a way that, after fixing has been completed, one side surface of this respectively fastened plate is opposite the inner surface of a first adjacent plate and a gap remains between this side surface and the inner surface, while the inner surface of this respectively fastened plate is opposite the side surface of a second neighboring plate and a further gap remains between this inner surface and the side surface. Specifically, the plate 26 is affixed in such a way that, after fixing has been completed, one side surface of this fastened plate 26 is opposite the inner surface of first neighboring plate 25 and a gap $d_2$ remains between this side surface and the inner surface, while the inner surface of this fastened plate 26 is opposite the side surface of second adjacent plate 27 and a further gap d3 remains between this inner surface and the side surface (cf. FIG. 4). Moreover, the plate 27 is affixed in such a way that, after fixing has been completed, one side surface of this fastened plate 27 is opposite the inner surface of a first neighboring plate 26 and a gap $d_3$ remains between this side surface and the inner surface, while the inner surface of this fastened plate 27 is opposite the side surface of second adjacent plate 28 and a further gap $d_4$ remains between this inner surface and the side surface (likewise cf. FIG. 4). By way of example, fastening of plates 26 and 27 is also carried out by way of clamps. In order to produce the gap $d_2$ between the inner surface of plate 25 and the side surface of plate 26 (cf. FIG. 4), use may also be made here of a spacer, the spacer being able to be removed again after affixing plate 26. The same also applies to plate 27. Here too, a spacer may also be introduced between the inner side of plate 26 and the side surface of plate 27 for the purposes of generating the gap $d_3$ (cf. FIG. 4), the spacer being removed again after affixing plate 27. As can be seen from FIG. 4, plate 25, 26 and 27 each also have a seal 52, 53 and 54, which is affixed in a corresponding groove 60, 61 and 62 in the second end region on the inner surfaces of plates 25, 26 and 27. Now, in the last method step, the four gaps $d_1$-$d_4$ between the plates 25, 26, 27 and 28 are filled with an adhesive 47, 48, 49 and 50, as may also be seen in FIG. 4. Here, the seals 51, 52, 53 and 54 (cf., also, FIG. 4) prevent the adhesive 47, 48, 49 and 50 from being able to flow out onto the inner surfaces of the plates 25, 26, 27 and 28.

Thus, in the steps shown in conjunction with FIGS. 7 to 9, a further plate (see further plates 26 and 27) is now in each case affixed onto each guide surface (guide surfaces 22 and 23) of the elongate guide body 12, on which no plate had been affixed up until that point. These further plates 26 and 27 were affixed in each case with the inner side thereof on a spacer (spacer sheets 37 and 38) previously arranged on the respective guide surfaces 22 and 23, respectively. Here, fixing was carried out in such a way that, after fixing of further plates 26 and 27 was completed, respectively one side surface of a respectively considered further plate 26 and 27, respectively, is opposite the inner surface of a first other plate and a gap remains between this side surface and the inner surface, while the inner surface of this respectively considered further plate is opposite the side surface of a second other plate and a further gap remains between this inner surface and the side surface.

In a further method step, which is not depicted separately by a figure, the tensioning devices 29 to 32 which are visible in FIG. 4 are attached, the tensioning devices being used to tension at least two of the interconnected plates against one another in each case. In the process, the threaded rods 43, 44, 45 and 46 are inserted into appropriately pre-manufactured grooves, with the tensioning force then being tensioned against one another by screwing on the nuts 56, 57, 58 and 59. Here, the nuts are self-locking nuts. Alternatively, these could also be secured in the position thereof by additional locknuts.

Figure 10:
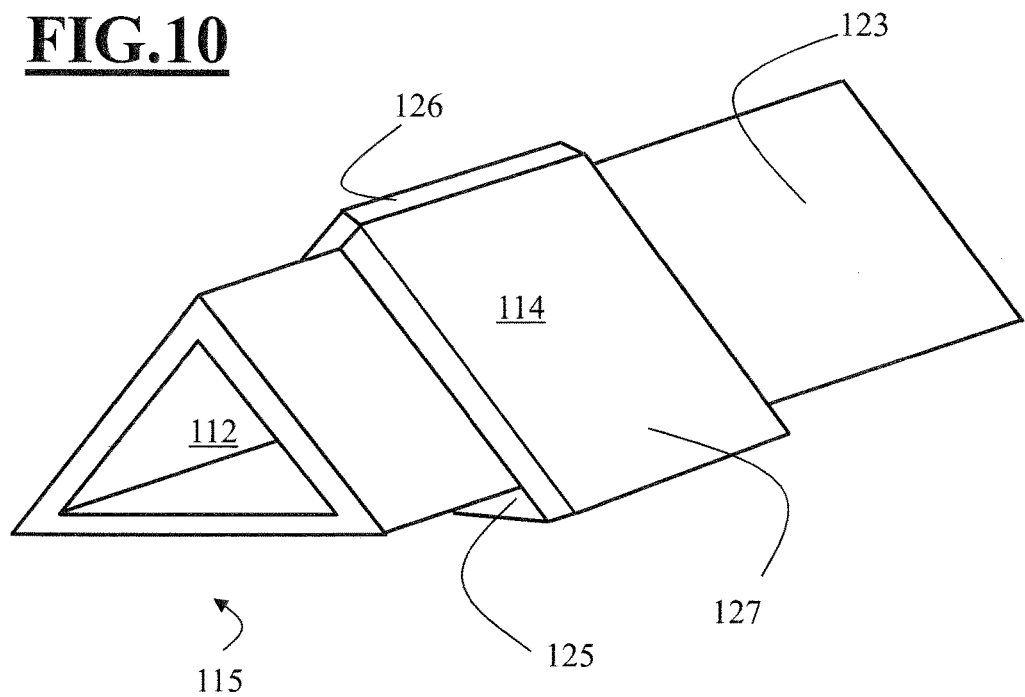
FIG. 10 is a schematic illustration of a linear guide 115, which is modified in relation to FIG. 2 and which could be used to guide the second measuring carriage 20 along the first measuring carriage 2 of the coordinate measuring machine 19 from FIG. 1.

Here, FIG. 10 shows a basic second embodiment of a linear guide 115 according to the invention, which may likewise be used in the coordinate measuring machine 19 in accordance with FIG. 1. Unlike the elongate guide body 12 in accordance with FIG. 2, the guide body 112 shown here has a triangular contour. Instead of being constructed from four plates, the bearing cage, denoted by 114 in this embodiment, is now constructed from three plates 125, 126 and 127. In a manner analogous to the illustrations in FIG. 2, FIG. 10 also only shows the plates 125, 126 and 127, with further details of the bearing cage 114 being dispensed with. Here, FIG. 11, which is analogous to FIG. 4, likewise shows the linear guide 115 depicted in FIG. 10 in a side view. As may be identified herefrom, this linear guide 115 also includes an elongate guide body 112 and a bearing cage 114, on the inner side of which fluid pressure bearings are provided. Here, the bearing cage 114 is provided to move along the elongate guide body 112 by way of the fluid pressure bearings. In this case, the bearing cage 114 has exactly three plates 125, 126 and 127 which are fastened to one another, wherein each plate 125-127 has an inner surface facing the guide body 112, an outer surface facing away from the guide body 112 and side surfaces between the inner surface and the outer surface. For the purposes of forming the bearing cage 114, each plate 125-127 is connected to a first other plate in a first end region and to a second other plate in an opposite second end region. In this bearing cage 114, once again, the following also applies for each one of the plates 125, 126 and 127: the first other plate, with the inner surface thereof, abuts against one of the side surfaces of a considered plate for the connection in the first end region of the considered plate, while the considered plate, with the inner surface thereof, abuts against one of the side surfaces of the second other plate in the second end region of the considered plate. For the plate 125, this means that the first other plate 127, with the inner surface thereof, abuts against one of the side surfaces of the considered plate 125 for the connection in the first end region of the considered plate 125, while the considered plate 125, with the inner surface thereof, abuts against one of the side surfaces of the second other plate 126 in the second end region of the considered plate 125. For the plate 126, this means that the first other plate 125, with the inner surface thereof, abuts against one of the side surfaces of the considered plate 126 for the connection in the first end region of the considered plate 126, while the considered plate 126, with the inner surface thereof, abuts against one of the side surfaces of the second other plate 127 in the second end region of the considered plate 126. For the plate 127, this means that the first other plate 126, with the inner surface thereof, abuts against one of the side surfaces of the considered plate 127 for the connection in the first end region of the considered plate 127, while the considered plate 127, with the inner surface thereof, abuts against one of the side surfaces of the second other plate 125 in the second end region of the considered plate 127.

As may be seen in FIG. 11, each plate 125, 126 and 127 includes a plurality of pressurized air connectors 133, 134 and 135 which are connected to pressurized air channels 139, 140 and 141. The pressurized air may reach the inner surfaces of the plates 125, 126 and 127 acting as air pressure bearings via the pressurized air connectors 133, 134 and 135 and the assigned pressurized air channels 139, 140 and 141. As may be seen furthermore from FIG. 11, the plates 125, 126 and 127 are adhesively bonded by way of an adhesive 147, 148 and 149. Alternatively, adhesive bonding by way of cement may also be undertaken. Just like in the embodiment in accordance with FIGS. 2 to 9, a seal 151, 152 and 153 is provided analogously to FIG. 4 at those points at which two plates are respectively connected to one another between the plates 125, 126 and 127, the seal preventing the ingress of the adhesive 147, 148 and 149 or of the cement into the region of the fluid pressure bearings on the inner surfaces of the plates 125-127. At the inner surface thereof in the second end region, each plate 125, 126 and 127 includes a groove 161, 162, 163 and 164, in which one of the seals 151, 152 and 153 is arranged in each case. In contrast to the embodiment in accordance with FIGS. 2 to 9, the three plates 125, 126 and 127 are tensioned against one another by way of only a single tensioning device 129. As may be seen in FIG. 11, the tensioning device 129 in this case includes a wire cable 145, a set screw 143 and an internally threaded sleeve 144. Here, the set screw 143 is fastened to one end of the wire cable 145, while the internally threaded sleeve 144 is fastened to the other end of the wire cable 145. Here, the tensioning force, which tensions the plates 125, 126 and 127 against one another, is applied by screwing the set screw 143 into the internally threaded sleeve 144.

As may be seen in FIG. 11, the bearing cage 114 has exactly three plates 125-127 in this case. Just like the plates 25 to 28 of the embodiment according to FIGS. 2 to 9, each plate 125, 126 and 127 is produced here from ceramics. However, alternatively, the plates 125 to 127 may also be produced from aluminum or steel. Here, the bearing cage 114 is produced completely analogously to the production method in accordance with FIGS. 5 to 9. This production method is explained below. However, the individual production steps are now no longer depicted in separate figures since the production method is relatively simple. The elongate guide body 112 is once again provided in a first step. With the inner surface thereof, a first plate 127 is affixed on a first guide surface 123 of the elongate guide body 112 in a second method step. In FIG. 11, the first guide surface 123 can be seen as the right upper guide surface of the elongate guide body 112. Here, fixing is carried out in such a way that, at the upper end, the side surface of the plate 127 is slightly recessed in order thus to let a gap $e_1$ arise. By way of example, a gauge may be used to adjust this gap $e_1$, the gauge being used to adjust the position of the first plate 127 on the first guide surface 123 in such a way that (as described below) the gap $e_1$ arises on the second guide surface 122 during subsequent fixing of the second plate 126. As already indicated in the previous sentence, a second plate 126, with the inner surface thereof, is affixed on a second guide surface 122 of the guide body 112 adjacent to the first guide surface 123 of the guide body 112 in a further method step. Here, the second plate 126, with the inner surface thereof, abuts against the second guide surface 122 of the guide body 112. Here, the side surface of plate 127 is opposite the inner surface of the other plate 126, with a gap $e_1$ remaining between the side surface of plate 127 and the inner surface of the other plate 126. Here, the opposite end of plate 126 is aligned flush with the guide surface 121. As may be seen from FIG. 11, this end of plate 126 is beveled accordingly. The gap $e_3$ which will arise in the subsequent method between the inner surface of plate 125 and the beveled side surface of plate 126 will in this case be generated by the spacer (spacer sheets 137).

Now, in a further method step, a further plate 125 is affixed on the single guide surface 121 of the elongate guide body 112 on which no plate has been affixed up until now. This further plate 125 is also affixed with the inner side thereof on the guide surface 121, wherein, in contrast to the other two already affixed plates 126 and 127, a spacer (spacer sheet 137) has previously been arranged on the guide surface 121. Here, fixing of this further plate 125 was once again carried out in such a way that, after fixing of further plate 125 was completed, respectively one side surface of considered further plate 125 is opposite the inner surface of a first other plate 127 and a gap $e_2$ remains between this side surface and the inner surface, while the inner surface of the considered further plate 125 is opposite the side surface of a second other plate 126 and a further gap $e_3$ remains between this inner surface and the side surface. As already explained above, the width of the gap $e_3$ is set by the spacer (spacer sheets 137). Moreover, at least one additional spacer, not depicted here, may be used to set the gap $e_2$, the spacer being placed between the inner surface of already affixed plate 127 and the appropriately beveled side surface of further plate 125 before affixing further plate 125, wherein the spacer is removed again after affixing the further plate 125. In a subsequent step, the gaps $e_1$, $e_2$ and $e_3$ between the three plates 125, 126 and 127 are now filled by an adhesive 147, 148 and 149 or by cement. After the adhesive has cured, the tensioning device is attached in the last method step, the tensioning device being used to tension all three interconnected plates 125, 126 127 against one another.

What is important to mention here in conjunction with the bearing cage 114 in accordance with FIGS. 10 and 11 is that the side edges of the plates 125, 126 and 127, which each abut against the inner surface of another plate, must be beveled in accordance with the angles of the elongate guide body 112. In the present case, beveling of the side surface of plate 127 at the end at which the latter abuts against the inner surface of plate 126 is not necessary since the triangle formed by the elongate guide body 112 has a right angle at the upper side thereof. Moreover, further beveling of the remaining side edges in accordance with the requirements is also advisable.

Instead of the embodiment shown in FIGS. 10 and 11, the guide surfaces 121 to 123 of the elongate guide body 112 may, however, also have different angles in relation to one another. By way of example, provision may be made of an equilateral guide, in which there is an angle of 60° between the guide surfaces in each case, such that the plates 125 to 127 then also in each case have an angle of 60° in relation to one another. In this case, the plates would, once again, have to be beveled accordingly. As the adhesive fills the gap between the plates, the beveling may be carried out with relatively generous tolerances.

As may be seen with reference to the coordinate measuring machine 19 according to FIG. 1, the coordinate measuring machine shown in FIG. 1 is a portal measuring machine comprising a first measuring carriage 2 mounted such that it is movable in a first direction along two guides arranged laterally on a base (measuring table 1) of the coordinate measuring machine. A second measuring carriage 20 is guided in a movable manner along the part of the first measuring carriage 2 spanning the base (measuring table 1), a third measuring carriage 3 being guided in a movable manner in the vertical direction along the second measuring carriage 20. A sensor 4 is fastened to the lower end of the measuring carriage 3. For the purposes of movably mounting the second measuring carriage 20 on the first measuring carriage 2, provision is made here for the linear guide 15 according to the invention, as was described in a purely exemplary manner in conjunction with FIGS. 2 to 9 for a first embodiment or in conjunction with FIGS. 10 and 11 for a second embodiment.

FIG. 12 shows a very abstract schematic diagram of an alternative coordinate measuring machine to the coordinate measuring machine 19 according to FIG. 1, in the form of a bridge measuring machine on which a linear guide 15 according to the invention may likewise be used in a particularly advantageous manner. Here, the same reference signs as in FIG. 1 denote the same elements. As may be identified in FIG. 12, the first measuring carriage is not embodied as a portal in this case, but rather as a bridge. Here, the bridge is substantially formed by the elongate guide body 12 of the linear guide 15 according to the invention, and so the first measuring carriage does not receive a separate reference sign in the case of FIG. 12. Unlike in FIG. 1, the first measuring carriage (elongate guide body 12) is not guided on the measuring table 1 of the base, but instead on guide surfaces extending on two sidewalls 156 and 157 of the base. The sidewalls 156 and 157 are fastened to the measuring table 158 which is part of the base.

Thus, the coordinate measuring machine shown in FIG. 12 is a bridge measuring machine comprising a first measuring carriage (elongate guide body 12) mounted such that it is movable in a first direction along two guides arranged laterally on a base (including, inter alia, the measuring table 158) of the coordinate measuring machine. A second measuring carriage 20 is guided in a movable manner along the part of the first measuring carriage spanning the base, a third measuring carriage 3 being guided in a movable manner in the vertical direction along the second measuring carriage 20. Here, a sensor 4, which is not depicted here in FIG. 12, is fastened to the lower end of the measuring carriage 3. For the purposes of movably mounting the second measuring carriage 20 on the first measuring carriage 2, provision is made here for the linear guide 15 or 115 according to the invention, as was described in a purely exemplary manner in conjunction with FIGS. 2 to 9 for a first embodiment or in conjunction with FIGS. 10 and 11 for a second embodiment.

However, it is understood that the linear guide according to the invention may also be used in different coordinate measuring machines, for example in horizontal arm measuring machines, or in other machines used in engineering, such as for example machine tools, milling machines, et cetera. Moreover, the linear guide according to the invention may also be used to guide the third measuring carriage 3 of the coordinate measuring machines according to FIG. 1 or according to FIG. 12. In this case, the bearing cage is then situated in the second measuring carriage 20 while the third measuring carriage 3 then is formed by the elongate guide body.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Measuring table
2 First measuring carriage
3 Third measuring carriage
4 Sensor
5 Probe
6 Workpiece
7 Control system
8 Rotation unit
9 Scale system
10 Scale system
11 Scale system
12 Guide body
13 Control panel
14 Bearing cage
15 Linear guide
16 Column
17 Measurement computer
18 Column
19 Coordinate measuring machine
20 Second measuring carriage
21 Guide surface
22 Guide surface
23 Guide surface
24 Guide surface
55 Plate
26 Plate
27 Plate
28 Plate
29 Tensioning device
30 Tensioning device
31 Tensioning device
32 Tensioning device
33 Pressurized air connector
34 Pressurized air connector
35 Pressurized air connector
36 Pressurized air connector
37 Spacer sheet
38 Spacer sheet
39 Pressurized air channel
40 Pressurized air channel
41 Pressurized air channel
42 Pressurized air channel
43 Threaded rod
44 Threaded rod
45 Threaded rod
46 Threaded rod
47 Adhesive
48 Adhesive
49 Adhesive
50 Adhesive
51 Seal
52 Seal
53 Seal
54 Seal
56 Nut
57 Nut
58 Nut
59 Nut
60 groove
61 groove
62 groove
63 groove
121 Guide surface
122 Guide surface
123 Guide surface
125 Plate
126 Plate
127 Plate
129 Tensioning device
133 Pressurized air connector
134 Pressurized air connector
135 Pressurized air connector
137 Spacer sheet
139 Pressurized air channel
140 Pressurized air channel
141 Pressurized air channel
143 Set screw
144 Internally threaded sleeve
145 Wire cable
147 Adhesive
148 Adhesive
149 Adhesive
151 Seal
152 Seal
153 Seal 156 Sidewall
157 Sidewall
158 Measuring table
161 groove
162 groove
163 groove

What is claimed is:

1. A linear guide comprising:
an elongate guide body;
a bearing cage defining inner sides;
a plurality of fluid pressure bearings disposed on said inner sides of said bearing cage;
said bearing cage being configured to move along said elongate guide body via said fluid pressure bearings;
said bearing cage including at least three plates fastened to one another;
each of said plates having an inner surface facing said elongate guide body, an outer surface facing away from said guide body, and side surfaces between respective inner surfaces and respective outer surfaces;
each of said at least three plates having a first end region and a second end region disposed opposite to said first end region;
each of said at least three plates having a first connection whereat said plate is connected at said first end region thereof to a first other one of said at least three plates and a second connection whereat said plate is connected at said second end region thereof to a second other one of said at least three plates for forming said bearing cage;
each of said at least three plates abutting with one of said side surfaces thereof against the respective inner surface of the first other one of said at least three plates for said first connection;
each of said at least three plates abutting with their respective inner surface against one of said side surfaces of the second other plate for said second connection;
said at least three plates being bonded to one another by way of an adhesive or by way of a cement;
a plurality of seals, wherein one of said seals is disposed at each point at which two of said at least three plates are connected to one another; and,
said seals being configured to prevent an ingress of the adhesive or of the cement into the region of said fluid pressure bearings on said inner surfaces of said at least three plates.

2. The linear guide of claim 1, wherein said at least three plates are manufactured from ceramics or from aluminum or from steel.

3. The linear guide of claim 1, wherein said fluid pressure bearings are air bearings.

4. The linear guide of claim 1 further comprising at least one tensioning device configured to additionally tension said at least three plates against one another.

5. The linear guide of claim 4, wherein said tensioning device includes a threaded rod and two nuts or said tensioning device includes a wire cable, a set screw and an internally threaded sleeve.

6. The linear guide of claim 1, wherein said bearing cage includes exactly four plates or said bearing cage includes exactly three plates.

7. The linear guide of claim 1, wherein the linear guide is configured for a coordinate measuring machine.

8. A linear guide comprising:
an elongate guide body;
a bearing cage defining inner sides;
a plurality of fluid pressure bearings disposed on said inner sides of said bearing cage;
said bearing cage being configured to move along said elongate guide body via said fluid pressure bearings;
said bearing cage including at least three plates fastened to one another;
each of said plates having an inner surface facing said elongate guide body, an outer surface facing away from said guide body, and side surfaces between respective inner surfaces and respective outer surfaces;
each of said at least three plates having a first end region and a second end region disposed opposite to said first end region;
each of said at least three plates having a first connection whereat said plate is connected at said first end region thereof to a first other one of said at least three plates and a second connection whereat said plate is connected at said second end region thereof to a second other one of said at least three plates for forming said bearing cage;
each of said at least three plates abutting with one of said side surfaces thereof against the respective inner surface of the first other one of said at least three plates for said first connection;
each of said at least three plates abutting with their respective inner surface against one of said side surfaces of the second other plate for said second connection; and,
each of said at least three plates having a groove on said inner surface thereof in said second end region, with corresponding ones of said seals being arranged in the corresponding one of said grooves.

9. A coordinate measuring machine comprising:
a linear guide having an elongate guide body and a bearing cage defining inner sides;
said linear guide further having a plurality of fluid pressure bearings disposed on said inner sides of said bearing cage;
said bearing cage being configured to move along said elongate guide body via said fluid pressure bearings;
said bearing cage including at least three plates fastened to one another;
each of said plates having an inner surface facing said elongate guide body, an outer surface facing away from said guide body, and side surfaces between respective inner surfaces and respective outer surfaces;
each of said at least three plates having a first end region and a second end region disposed opposite to said first end region;
each of said at least three plates having a first connection whereat said plate is connected, at said first end region thereof, to a first other one of said at least three plates and a second connection whereat said plate is connected at said second end region thereof to a second other one of said at least three plates for forming said bearing cage;
each of said at least three plates abutting with one of said side surfaces thereof against the respective inner surface of the first other one of said at least three plates for said first connection;
each of said at least three plates abutting with their respective inner surface against one of said side surfaces of the second other plate for said second connection;
said at least three plates being bonded to one another by way of an adhesive or by way of a cement;

a plurality of seals, wherein one of said seals is disposed at each point at which two of said at least three plates are connected to one another; and, said seals being configured to prevent an ingress of the adhesive or of the cement into the region of said fluid pressure bearings on said inner surfaces of said at least three plates.

10. The coordinate measuring machine of claim 9, wherein the coordinate measuring machine is a portal measuring machine or a bridge measuring machine, the coordinate measuring machine defining a base and further comprising:

a first measuring carriage mounted so as to be movable in a first direction along two guides arranged laterally on the base of the coordinate measuring machine;

a second measuring carriage guided in a movable manner along the part of the first measuring carriage spanning the base;

a third measuring carriage guided in a movable manner in the vertical direction along the second measuring carriage;

said third measuring carriage having a lower end;

a sensor fastened to said lower end of said third measuring carriage; and, said linear guide being configured for movably mounting the second measuring carriage on said first measuring carriage.

11. A method for making a linear guide, the method comprising the following method steps:

a) providing an elongate guide body having a plurality of guide surfaces including a first guide surface and a second guide surface;

b) affixing a first plate on the first guide surface of the elongate guide body via an inner surface of the first plate;

c) affixing a second plate on the second guide surface of the guide body via an inner surface of the second plate, the second guide surface adjoining the first guide surface of the guide body, wherein the second plate abuts against the second guide surface of the guide body via the inner surface of the second plate, wherein, further, a side surface of one of the two plates is opposite the inner surface of the respective other plate and wherein a gap ($d_1$; $e_1$) remains between this side surface of the one plate and the inner surface of the other plate, d) respectively affixing a further plate on each of said plurality of guide surfaces of the elongate guide body on which no plate has yet been fixed, wherein this further plate/these further plates is/are each affixed with the inner side thereof on a spacer previously arranged on the respective guide surface and, in the process, is/are affixed in such a way that once affixing of the further plate/the further plates has been completed, one side surface of a further plate considered in each case is respectively opposite the inner surface of a first other plate and a gap remains between this side surface and the inner surface, while the inner surface of this further plate considered in each case is opposite the side surface of a second other plate and a further gap remains between this inner surface and the side surface; and, e) filling said gaps with an adhesive or cement.

12. The method of claim 11 further comprising the step of applying a tensioning device after step e), the tensioning device being configured to tension at least two of the interconnected plates against one another in each case.

13. The method of claim 11, wherein a gauge is used for adjusting the gap in step c), said gauge being used to set the position of the first plate on the first guide surface in step b) in such a way that the gap ($d_1$; $e_1$) arises when affixing the second plate on the second guide surface in step c).

14. The method of claim 11, wherein at least one additional spacer is used to set at least one gap in step d), said spacer being placed between the inner surface of an already affixed plate and the side surface of a further plate before affixing the further plate, wherein the spacer is removed again after affixing the further plate.

* * * * *